United States Patent Office.

HEINRICH BRUNCK, OF LUDWIGSHAFEN-ON-THE-RHINE, BAVARIA, ASSIGNOR TO THE BADISCHE ANILIN AND SODA FABRIK, OF MANNHEIM, GERMANY.

THE PRODUCTION OF BLUE COLORS UPON TEXTILE FABRICS.

SPECIFICATION forming part of Letters Patent No. 258,531, dated May 23, 1882.

Application filed November 2, 1881. (Specimens.)

*To all whom it may concern:*

Be it known that I, HEINRICH BRUNCK, a subject of the King of Bavaria, residing at Ludwigshafen-on-the-Rhine, in the Kingdom of Bavaria and Empire of Germany, have invented new and useful Improvements in Dye-Stuffs or Coloring-Matters in or upon a Textile Fiber, of which the following is a specification.

This invention relates to the production of a blue color in or upon a textile fiber, yarn, or cloth, whether knit or woven, by impregnating the same with the solution of a new compound which I term "anthracene-blue," and then exposing the impregnated fiber to heat of from 70° to 100° centigrade.

In carrying out my invention I take artificial alizarine, from which the yellowish-red dyeing coloring-matters have been separated, and convert the same into alizarine-orange by the action of nitrous, hyponitric, or nitric acids, substantially in the manner described in Letters Patent granted to Heinrich Caro, January 9, 1877, No. 186,032. I then take one part of this alizarine-orange in paste, containing about fifteen per cent. dry coloring-matter, one part of glycerine of 28° Baumé, and five parts of sulphuric acid of 66° Baumé, and after having mixed these materials I heat the mixture slowly to about 100° centigrade. During the reaction the mass assumes a dark color, and after a short time, when no more nitroalizarine can be traced in the mass, the reaction is terminated by the addition of cold water. The temperature must not be permitted to rise above 110° centigrade, since by a too vigorous reaction the product already formed is destroyed. After the reaction has been terminated in the manner above stated the mass is left to cool, and it is then placed on a filter and washed with cold water. The mother-liquor contains surplus acid, glycerine, and easily-soluble products of the reaction. The product remaining on the filter is purified by boiling the same in very dilute sulphuric acid (two and one-half per cent.) and filtering while boiling. The purified product which is in solution separates, after the filtrate has been cooled, in beautiful red crystals, which, on being washed with water, assume a blue color. Of this substance I take a quantity representing about twelve pounds of dry crystals, and add thereto from twenty-five to thirty pounds of a solution of bisulphite of soda of 1.25 specific gravity. This mixture is left untouched in closed vessels for about eight to fourteen days, during which time a portion is dissolved, and the solution thus obtained is filtered off from the undissolved part. From this solution my new anthracene-blue is obtained, either by precipitation, for instance, with common salt, or by a careful evaporation at a temperature not exceeding 50° centigrade. The undissolved portion may be subjected to the same treatment.

The anthracene-blue obtained in the manner described is in form of a crystalline mass. It is easily soluble in water with a reddish-brown color, and has, when dissolved, the property of being decomposed either when heated over 70° centigrade or at an ordinary temperature, by strong acids or by alkalies, and their carbonates, with the reproduction of the substance hereinbefore described, as forming red crystals, which become blue after washing with water. It is, however, not decomposed when to an aqueous solution acetic acid, tartaric acid, or the lime salts, the magnesia salts, and the chromic salts of these organic acids are added.

In order to develop the color in or upon a textile fiber, yarn, or cloth, I impregnate such fiber with the aqueous solution of my new anthracene-blue, and then expose the same to heat of from 70° to 100° centigrade, preferably steam heat; or, instead of using the aqueous solution of anthracene-blue alone, I first impregnate the fiber, yarn, or cloth with a solution of acetic acid or tartaric acid, or with a solution of one of the above-named salts of said acids, and then with the aqueous solution of my new anthracene-blue, and expose the same to a temperature of from 70° to 100° centigrade, preferably by steaming.

What I claim as new, and desire to secure by Letters Patent, is—

1. The within-described process for developing a blue color in or upon a textile fiber, yarn, or cloth, whether knit or woven, by impregnating said fiber, yarn, or cloth, with an aqueous solution of the anthracene-blue hereinbefore described, and then exposing the same to heat, substantially as set forth.

2. The within-described process for developing a blue color in or upon a textile fiber, yarn, or cloth, whether knit or woven, by impregnating said fiber, yarn, or cloth with a solution of acetic acid or tartaric acid, or the hereinbefore-named salts of said acids, and with an aqueous solution of the anthracene-blue hereinbefore described, and then exposing the same to heat, substantially as set forth.

3. As a new article of manufacture, textile fiber, yarn, or cloth, whether knit or woven, having a blue color developed within or upon the same by impregnating it with an aqueous solution of the anthracene-blue hereinbefore described, and then exposing it to heat, or by any other means which will produce the same result.

In testimony whereof I have hereunto set my hand in the presence of two subscribing witnesses.

HEINRICH BRUNCK.

Witnesses:
CARL GLASER,
AUGUST HAUSER.